C. T. HARDMAN.
LEAD CONTROL FOR VALVE GEARS.
APPLICATION FILED APR. 7, 1919.
1,360,942.
Patented Nov. 30, 1920.
4 SHEETS—SHEET 2.
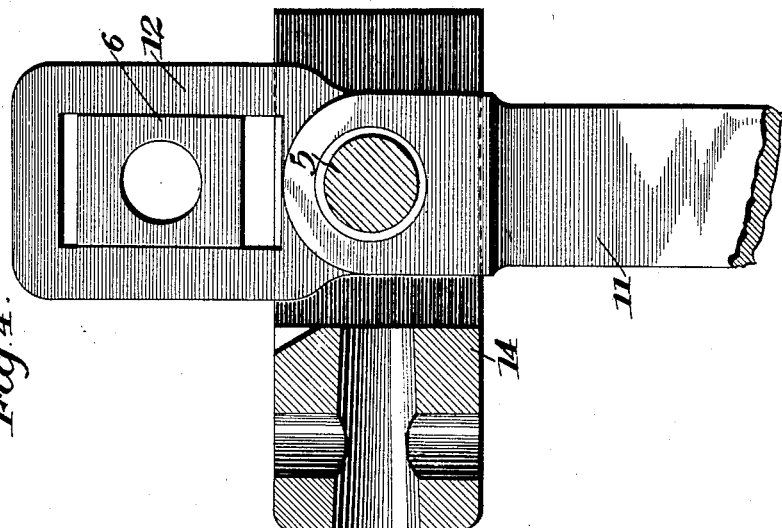
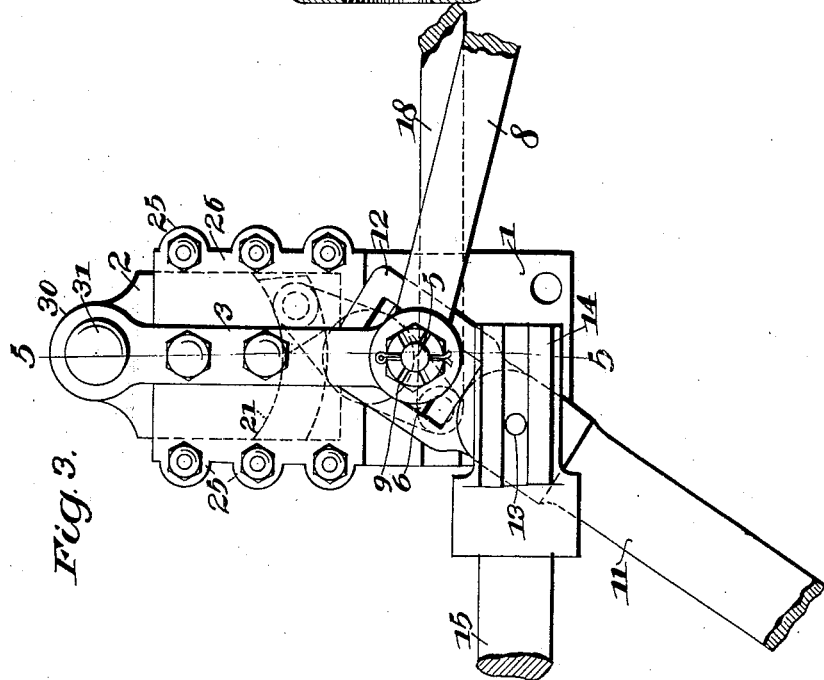
WITNESSES
INVENTOR
Charles T. Hardman
BY
ATTORNEYS C. T. HARDMAN.
LEAD CONTROL FOR VALVE GEARS.
APPLICATION FILED APR. 7, 1919.
1,360,942.
Patented Nov. 30, 1920.
4 SHEETS—SHEET 3.
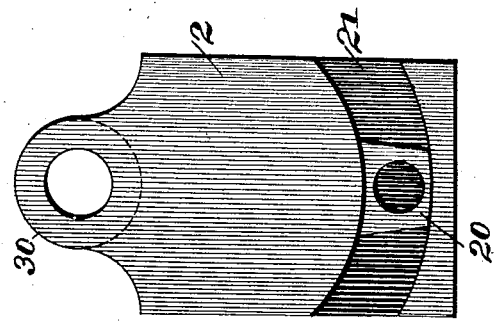
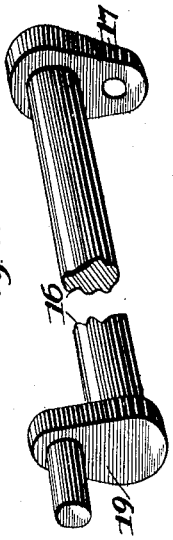
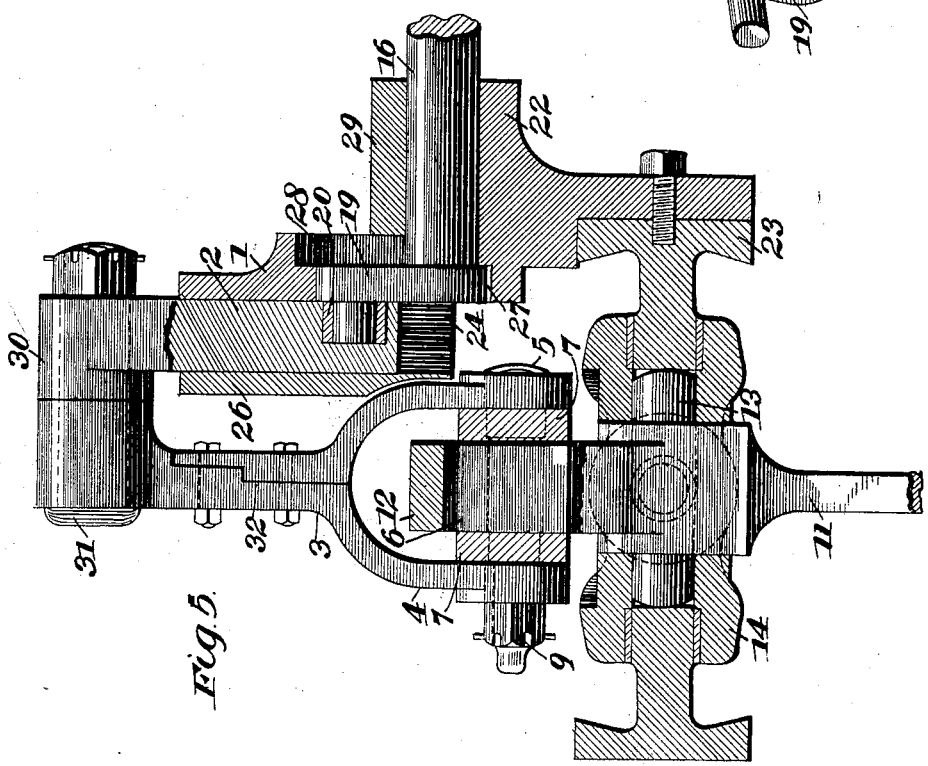
WITNESSES
INVENTOR
Charles T. Hardman
BY
ATTORNEYS C. T. HARDMAN.
LEAD CONTROL FOR VALVE GEARS.
APPLICATION FILED APR. 7, 1919.
1,360,942.
Patented Nov. 30, 1920.
4 SHEETS—SHEET 4.
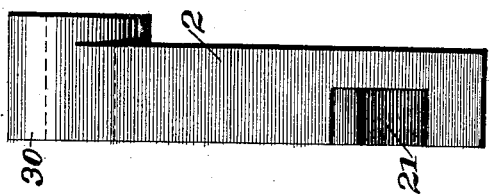
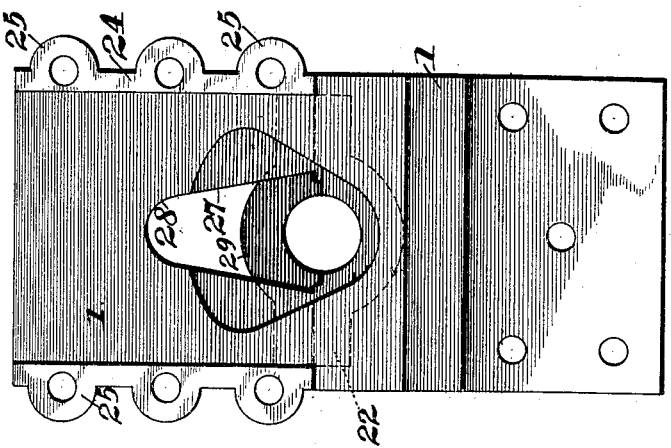
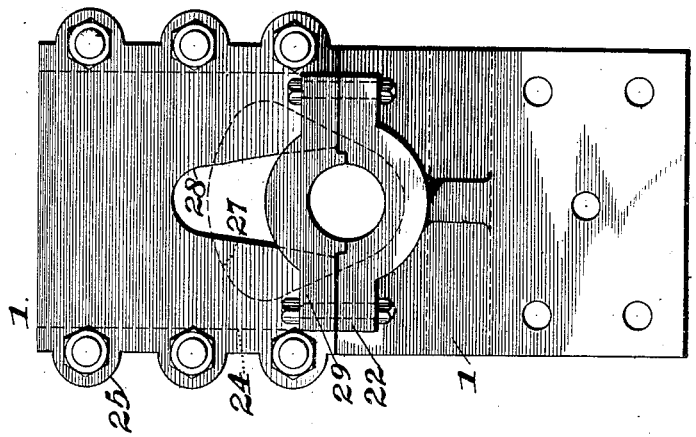
WITNESSES
INVENTOR
Charles T. Hardman
BY
ATTORNEYS

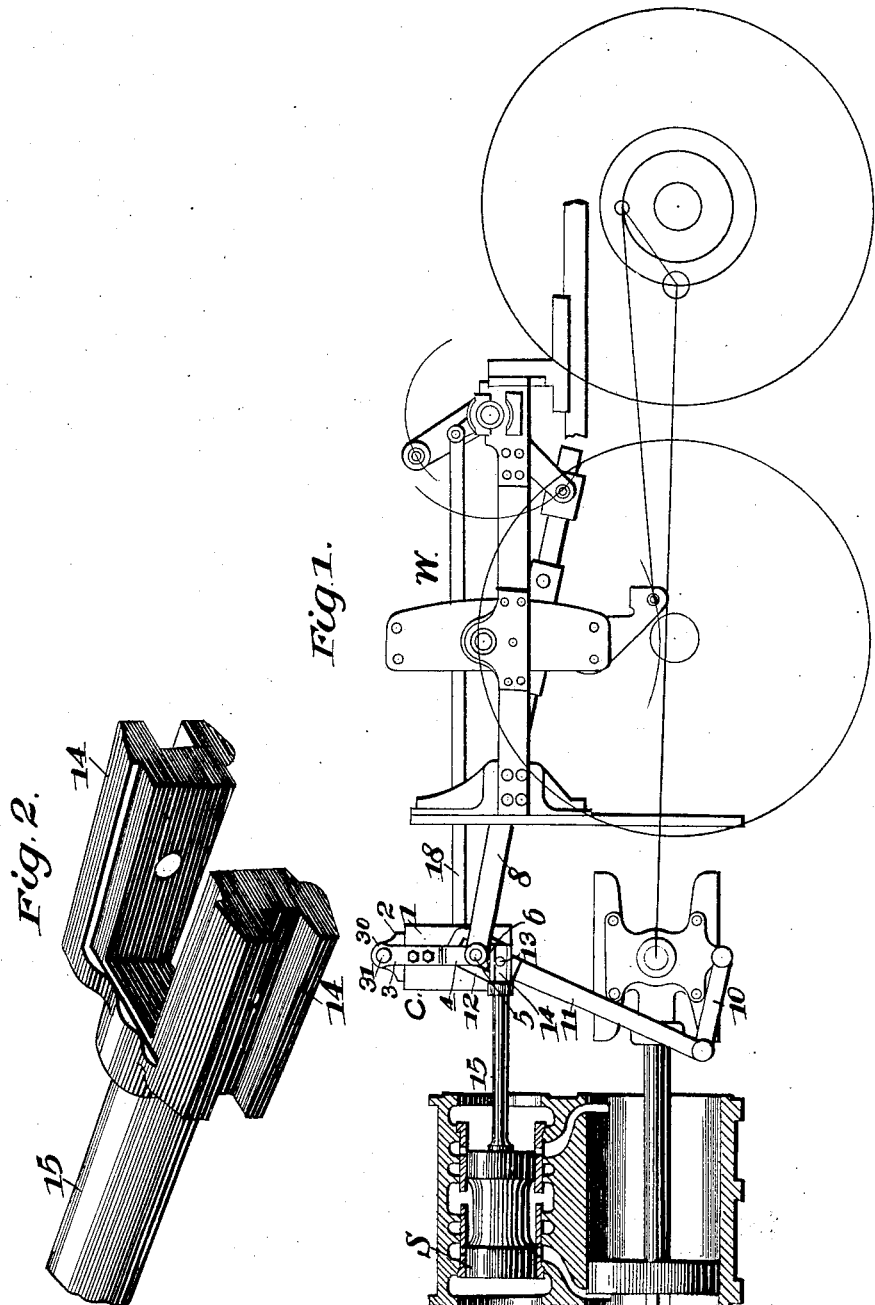

UNITED STATES PATENT OFFICE.

CHARLES TERRELL HARDMAN, OF ALBANY, ALABAMA, ASSIGNOR OF ONE-HALF TO H. K. ADAMS, OF NASHVILLE, TENNESSEE.

LEAD CONTROL FOR VALVE-GEARS.

1,360,942.  Specification of Letters Patent.  Patented Nov. 30, 1920.

Application filed April 7, 1919. Serial No. 287,974.

*To all whom it may concern:*

Be it known that I, CHARLES TERRELL HARDMAN, a citizen of the United States, and a resident of Albany, in the county of Morgan and State of Alabama, have invented certain new and useful Improvements in Lead Control for Valve-Gears, of which the following is a specification.

My invention relates to improvements in valve gears for locomotive engines, and it consists in the constructions, combinations and arrangements herein described and claimed.

The foremost object of my invention is to provide an automatic lead control adapted more particularly for use with the Walschaert valve gear, the purpose thereof being to automatically increase the lead of the steam valve as the engine speed increases.

A further object of the invention is to provide an automatic lead control for locomotive valve gears, to automatically increase the lead of the steam valve when the reverse lever is hooked up for higher speed.

Other objects and advantages will appear in the following specification, reference being had to the accompanying drawings, in which:

Figure 1 is a diagram of the Walschaert valve gear, showing the automatic lead control in operative relationship therewith, Fig. 2 is a detail perspective view of the valve stem cross head, Fig. 3 is a side elevation of the improved lead control, Fig. 4 is a detail sectional view showing the position of the lead block in the combination lever, hereinafter referred to, Fig. 5 is a vertical section taken substantially on the line 5—5 of Fig. 3, Fig. 6 is a detail view of the lift block of Fig. 5, Fig. 7 is a detail perspective view of the control shaft, Figs. 8 and 9 are rear and front elevations respectively, of the guide box of the lift block, and Fig. 10 is an edge view of the lift block.

As stated above, the improved lead control generally indicated C in Fig. 1, is operatively combined with the Walschaert valve mechanism generally indicated W, so as to automatically increase the lead of the steam valve S as the speed increases. For the purpose of describing the invention, an extended explanation of the construction and mode of operation of the Walschaert valve gear is thought unnecessary.

It has been demonstrated by actual experience, that this particular valve gear has no means for regulating the port opening of the steam valve to properly accord with the various engine speeds. It has been found in actual practice that if enough lead is given with the ordinary Walschaert valve gear to suit high engine speeds, difficulties are subsequently encountered in starting a heavy train, for the reason that the proper lead for high speed will not allow holding the steam as long as it would be held if no lead were given at the start. Furthermore, the pre-admission at slow speed also limits the starting capacity very materially. By applying the improved automatic lead control, the above objections are all eliminated, and in order that the invention may be fully understood, attention is directed to the accompanying drawings and following description wherein the construction and mode of operation is fully pointed out.

A guide box 1 which is suitably fixed in position on the locomotive, houses a lift block 2, which by reason of its vertical adjustment is capable of automatically changing the degree of lead of the steam valve S. To accomplish this purpose, the lift block 2 carries a lift link 3, through the bifurcated end 4 of which a radius bar pin 5 is fitted as shown in Fig. 5, to centrally support the lead block 6.

The jaws 7 of the radius bar 8, which is a part of the valve gear, are also pivoted on the bar pin 5 and are disposed at the sides of the block 6, both of said elements being located inside of the bifurcations 4 on the link 3. In order that the various parts may freely move with respect to each other, the radius bar pin 5 is made in a plurality of diameters as indicated in dotted lines in Fig. 5, so that the respective enlargements of the pin abut adjacent parts, prevent binding when the nut 9 is tightened, and permit the free relative movement above referred to.

Pivotally mounted on a link 10, is the combination lever 11 which has a slotted head 12 at the upper end for receiving the lead block 6 above referred to. The cross head pin 13 provides the means of attachment of the combination lever to the cross head 14 of the stem 15 of the valve S, and by changing the position of the lead block 6 vertically with respect to the pin 13, the extent of the strokes of the stem 15 is changed and the lead of the valve S controlled accordingly.

In other words, the controlling or regulating of the lead of the steam valve S is simply a matter of vertically shifting the fulcrum 5 of the combination lever 11. When the lead block 6 is adjusted high in the slotted head 12, longer strokes of the valve stem 15 will result. Conversely, when the lead block 6 is low in the slotted head 12, the strokes of the stem 15 will be correspondingly shorter.

The changing of the vertical positions of the lead block 6 is accomplished either by the automatic mechanism in Fig. 1 or by the fluid pressure operated mechanism in Fig. 11. Either may be used with the same result, or other suitable mechanism may be employed if such be found more desirable. The means for automatically raising and lowering the lead block 6 includes the control shaft 16, with a crank 17 on the inner end for connection to the lead control rod 18, and with a lift crank 19 on the outer end, for connection to the slot block 20. The slot block 20 rides in the arcuate slot 21 of the lift block 2, and as the control shaft 16 is turned in its bearings 22, the lift block 2 and consequently the lead block 6, is raised and lowered, as explained.

Before describing the mechanism in Fig. 11, whereby the same result, namely, the raising and lowering of the lead block 6, is accomplished by means of fluid pressure, the details of construction of the correlated parts of the invention should first be understood. In Figs. 5, 8 and 9, the guide box generally indicated 1, is shown to consist of a casting which is suitably affixed to some adjacent part as for example, one of the guides 23 on which the cross head 14 operates.

The upper part of the guide box 1 has forward extensions 24 with suitably arranged and apertured ears 25 to receive the cover plate or cap 26 which when in place, completes the channel or guide in which the lift block 2 operates. On removing the guide box cap 26, the structural arrangement of the rear wall of the guide box can be seen as shown in Fig. 9.

A recess 27 accommodates the lift crank 19. This crank is inserted through an opening 28 which is large enough to permit passage of the crank, before putting the bearing cover 29 in place. In Fig. 5, the recess 27 is shown to extend slightly below the bearing portion of the shaft 16, so as to make room for the wheel of the crank 19 and prevent endwise displacement of the shaft. The arrangement illustrated keeps the crank 19 in position in the recess.

A boss 30 on the lift block 2, provides a support for the lift block pin 31 which is mounted in a similar boss on the lift link 3, as clearly shown in Fig. 5. It is to be observed that the lift link 3 is separated at 32 so as to enable easy disassembling of the adjacent parts at the radius pin 5, or for other purposes, should there be an occasion necessitating such a requirement.

As stated before, the whole invention lies in shifting the lead block 6 so as to change the fulcrum of the combination lever 11 and consequently to increase or decrease the strokes of the steam valve S. In order that those skilled in the art may see what the advantages of the automatic lead control are, attention is directed to the following.

When the Walschaert valve gear is set with no lead, the port opening at 25 per cent. cutoff is only $\frac{3}{32}$ of an inch. When set with $\frac{1}{4}$ inch lead, the port opening at 25 per cent. cut off will be $\frac{1}{4}$ inch plus $\frac{3}{32}$ of an inch which equals $\frac{11}{32}$ of an inch.

With the improved automatic lead control applied, the steam valve is set with no lead at full stroke, and $\frac{3}{8}$ inch lead at 25 per cent. cut off. At this point of cut off the port opening will never be less than $\frac{3}{8}$ of an inch plus $\frac{3}{32}$ of an inch which equals $\frac{15}{32}$ of an inch. If it be desired to have more port opening at this point of cut off, it can be obtained by increasing the lead.

Now, as stated above, there being no lead at full travel of the valve, and as the valve travel is shortened, lead occurs and increases in proportion, this being very desirable and necessary as the speed increases. The lack of sufficient port opening limits the speed and pulling power of a high speed locomotive having this particular valve gear attached. But as stated at the first part of the description, the use of the improved lead control remedies the present evils and automatically adjusts the lead to suit the particular speed at which the engine is running.

While the construction and arrangement of the improved lead control as herein described and claimed, is that of a generally preferred form, obviously modifications and changes may be made without departing from the spirit of the invention or the scope of the claims.

I claim:—

1. An automatic lead control comprising in combination, a valve with a stem, an oscillating actuating lever pivoted to the stem, an adjacent guide box, an adjustable fulcrum for said lever including a lead block slidably mounted in a projecting end of the lever, a supporting link for the block, slidable supporting means for the link in said box and revoluble means journaled in said box, including a connection to said slidable means, for changing the position of said fulcrum on operating said revoluble means.

2. In an automatic lead control, means for supporting the fulcrum of a valve actuating lever, including a link; a mounting for said link including a lift block with a slot, a relatively fixed guide box including a channel for said block, with an adjacent recess having an opening, and revoluble means journaled on said guide box, with means including a crank having an operative connection to said lift block through said slot, said crank operating in the recess and being insertible thereinto through said opening.

3. The combination in a lead control, of a channeled guide box with a recess having an opening offset in respect to the recess to provide an intermediate shoulder, a lift block with a curved slot, slidable in the channel, and a control shaft with a crank in the recess adjacent to the lift block in pin connection with said slot, sustained in position by engagement with said shoulder.

4. The combination in an automatic lead control, of an oscillating actuating lever with a slotted head, with a valve stem pivoted thereto; an adjustable fulcrum for the lever comprising a lead block in the slot, a guided lift block with a curved slot, and a lift link pivotally carried by the lift block, supporting the lead block; and a shaft with a crank having a pin in the slot to move the lift block by the turning of the crank shaft.

CHARLES TERRELL HARDMAN.